(12) United States Patent
Frensch et al.

(10) Patent No.: US 12,646,082 B2
(45) Date of Patent: Jun. 2, 2026

(54) WEB PRESENCE BASED LEGITIMACY ANALYSIS

(71) Applicant: Capital One Services, LLC, McLean, VA (US)

(72) Inventors: Steve Frensch, Kitchener (CA); Amr Abouelkhair, Waterloo (CA); Elijah Moreau-Arnott, Guelp (CA); Yuqi Zhao, North York (CA)

(73) Assignee: Capital One Services, LLC, McLean, VA (US)

( * ) Notice: Subject to any disclaimer, the term of this patent is extended or adjusted under 35 U.S.C. 154(b) by 882 days.

(21) Appl. No.: 17/530,264

(22) Filed: Nov. 18, 2021

(65) Prior Publication Data

US 2023/0153830 A1     May 18, 2023

(51) Int. Cl.
*G06Q 30/018*     (2023.01)
*G06F 11/362*     (2025.01)
*H04L 9/32*     (2006.01)

(52) U.S. Cl.
CPC ..... *G06Q 30/0185* (2013.01); *G06F 11/3624* (2013.01); *H04L 9/3263* (2013.01)

(58) Field of Classification Search
CPC .................................................. G06Q 30/0185
See application file for complete search history.

(56) References Cited

U.S. PATENT DOCUMENTS 8,065,233 B2     11/2011     Lee et al.
8,396,935 B1     3/2013     Ciurumelea et al.

8,626,663 B2     1/2014     Nightengale et al.
8,713,644 B2     4/2014     Krishna et al.
8,725,597 B2     5/2014     Mauseth et al.
(Continued)

FOREIGN PATENT DOCUMENTS

CN     111523832     2/2021
KR     20150064331 A  *  6/2015
(Continued)

OTHER PUBLICATIONS

R. Abdellaoui and M. Pasquet, "Secure Communication for Internet Payment in Heterogeneous Networks," 2010 24th IEEE International Conference on Advanced Information Networking and Applications, Perth, WA, Australia, 2010, pp. 1085-1092, doi: 10.1109/AINA.2010.45 (Year: 2010).*
(Continued)

*Primary Examiner* — Lynda Jasmin
*Assistant Examiner* — Ehrin L Pratt
(74) *Attorney, Agent, or Firm* — Foley & Lardner LLP

(57)     ABSTRACT

Web presence data is employed to determine merchant legitimacy. An address of a web page associated with a merchant named on a credit card transaction can be determined. Subsequently, a secure socket layer certificate associated with the web page can be acquired and utilized as a basis for computing a risk score of a merchant. The number of subject alternate names identified by the certificate can be determined and utilized as a factor in risk score computation. Other factors can include similarity of subject alternate names as well as web page code and content. The risk score can be compared to a threshold. When the risk score satisfies the threshold, an action can be triggered, such as generating a customer alert.

20 Claims, 8 Drawing Sheets

(56)                    References Cited

U.S. PATENT DOCUMENTS

| | | | |
|---|---|---|---|
| 9,330,357 | B1 | 5/2016 | Ferdowski et al. |
| 9,691,089 | B2 | 6/2017 | Grass et al. |
| 9,972,013 | B2 | 5/2018 | Howe |
| 10,366,378 | B1 | 7/2019 | Han et al. |
| 2008/0046334 | A1* | 2/2008 | Lee .................... G06Q 30/0185 705/318 |
| 2008/0140442 | A1* | 6/2008 | Warner .............. G06Q 30/0185 705/26.41 |
| 2011/0225076 | A1 | 9/2011 | Wang et al. |
| 2012/0316991 | A1 | 12/2012 | Fallows |
| 2014/0101258 | A1* | 4/2014 | Bank .................... H04L 51/212 709/206 |
| 2015/0052005 | A1 | 2/2015 | Howe |
| 2015/0106260 | A1 | 4/2015 | Andrews et al. |
| 2015/0170148 | A1* | 6/2015 | Priebatsch ........... G06Q 20/386 705/44 |
| 2016/0036828 | A1 | 2/2016 | Hughes |
| 2016/0078446 | A1* | 3/2016 | Trostle ................ G06Q 20/108 705/30 |
| 2016/0277193 | A1* | 9/2016 | Sabin ..................... H04L 9/321 |
| 2020/0151707 | A1* | 5/2020 | Mohamed ............ G06Q 20/409 |
| 2020/0228494 | A1* | 7/2020 | Dalal ..................... G06Q 30/02 |
| 2021/0320946 | A1* | 10/2021 | Boshmaf ............. H04L 63/0823 |
| 2022/0174092 | A1* | 6/2022 | Farjon ................... H04L 63/123 |

FOREIGN PATENT DOCUMENTS

| | | |
|---|---|---|
| WO | 2013082190 | 6/2013 |
| WO | 2019106659 A1 | 6/2019 |

OTHER PUBLICATIONS

International Search Report and Written Opinion issued in corresponding International Patent Application No. PCT/US2022/050074 on Jun. 16, 2023 (12 pages).

Corrected International Search Report and Written Opinion issued in corresponding International Patent Application No. PCT/US2022/050074 on Jun. 30, 2023 (12 pages).

International Search Report and Written Opinion issued in corresponding International Patent Application No. PCT/ on Jul. 5, 2023 (12 pages).

* cited by examiner

CUSTOMER    MERCHANT    CREDITOR

WEBPAGE

APPROVAL

WEB DATA

ALERT

MERCHANT/ FEEDBACK

MERCHANT ANALYSIS SYSTEM

WEB PRESENCE BASED LEGITIMACY ANALYSIS

BACKGROUND

E-commerce shopping continues to grow at a rapid pace with new online merchants popping up seemingly daily. Customers appreciate the availability and convenience offered by online shopping. Further, online shopping allows customers to compare pricing and find the best deals quickly. Advances in technology have made it relatively easy for substantially anyone to set up and operate an online store to meet customer demand, including unscrupulous individuals seeking to deceive or defraud customers.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

Briefly described, the subject disclosure pertains to evaluating online merchant legitimacy based on web presence data. A merchant name can be determined from a transaction record between the merchant and a customer. Subsequently, the merchant name is used to locate the merchant's web page address or uniform resource locator (URL). Web presence data can then be requested from a web server that hosts the web page associated with the URL. The web presence data can include a secure socket layer (SSL) certificate for securing communication as well as web page code and content. The web presence data or a portion thereof can be evaluated against relationships between the web presence data and legitimacy or fraud. In one instance, a risk score can be generated for the merchant that can be utilized to trigger further action, such as generating a user alert or informing a transaction approval process. In one embodiment, a machine learning model can extract features from web presence data pertinent to identifying the risk associated with a merchant and use those features to classify or score a merchant automatically.

According to one aspect, a system is provided that comprises a processor coupled to a memory that includes instructions that, when executed by the processor, cause the processor to identify a merchant from a credit card transaction, determine a web page address for the merchant, acquire a secure socket layer (SSL) certificate for the address through an SSL handshake process with a web server hosting the web page, determine the number of subject alternative names specified by the SSL certificate, determine a risk score based on the number of subject alternative names, and generate a customer alert when the risk score satisfies a second threshold. The instructions can further cause the processor to measure similarity between the subject alternative names and determine the risk score based on the similarity. Further, the instructions can cause the processor to determine at least one of an SSL certificate issue date or expiration date and determine the risk score based on at least one date. The instructions further cause the processor to acquire the source code of the web page, analyze the source code for an indicator of fraud, and determine the risk score based on a result of the analysis of the source code. In one instance, the indicator of fraud comprises use of a particular word or class of words, including those associated with nutrition or cosmetics. Furthermore, the instructions cause the processor to acquire an image that comprises part of the web page, compare the image to a set of one or more images associated with fraud, and determine the risk score based on a result of the comparison. Further yet, the instructions can cause the processor to evaluate the credit card transaction against a set of one or more historical fraudulent transactions and determine the risk score based on the evaluation. In one particular instance, the instructions can invoke a trained machine learning model to analyze the SSL certificate and automatically determine the risk score.

According to another aspect, a method is provided comprising determining a uniform resource locator (URL) for a merchant named on a credit card transaction, acquiring a secure socket layer (SSL) certificate associated with the URL through an SSL handshake process with a web server that hosts a web page of the URL, identifying a number of subject alternate names, computing a risk score based on the number of subject alternative names, and generating a customer alert when the risk score satisfies a threshold. The method further comprises analyzing similarity between the number of subject alternate names and computing the risk score based on the similarity. Further, the method comprises identifying an issue date of the SSL certificate and computing the risk score based on the issue date, as well as identifying an expiration date of the SSL certificate and computing the risk score based on the expiration date. The method can further comprise acquiring programmatic code associated with the URL and computing a risk score based on an analysis of the code. In one instance, the method can further comprise evaluating transactions with the merchant against one or more historic fraudulent transactions and computing the risk score based on a result of evaluating the transactions. Further, the method can comprise increasing the risk score to represent an increased risk when the number of subject alternative names satisfies a second threshold.

In accordance with another aspect, a method of assessing the risk of fraud posed by a merchant is disclosed that executes, on a processor, instructions that cause the processor to perform operations. The operations comprise training a machine learning model with data that captures a relationship between a secure socket layer (SSL) certificate of a merchant website and a fraudulent merchant transaction, invoking the machine learning model with a merchant named on a credit card transaction, receiving a risk score for the merchant from the machine learning model, and generating a customer alert when the risk score satisfies a threshold. The operations can further comprise training the machine learning model with data that captures a relationship between a number of subject alternate names specified for the certificate and the fraudulent merchant transaction. Further, the operations can include training the machine learning model with data that captures a relationship between similarity of subject alternate names specified for the certificate and the fraudulent merchant transaction. Further yet, the operations can include training the machine learning model with data that captures a relationship between merchant website text and fraudulent transactions.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Determining the legitimacy of an online merchant is a critical aspect of determining credit card fraud. Typical fraud and risk models rely on prior transaction patterns. Such models thus require transaction history or experience with a merchant before the legitimacy of the merchant can be determined. However, new merchants do not have much, if any, transactional history to determine merchant legitimacy. Further, online merchants can open quickly and close just as fast.

Details disclosed herein generally pertain to analyzing web presence data to determine merchant legitimacy. A merchant can be identified from a credit card transaction. A web page address or uniform resource locator (URL) associated with the merchant can be determined. Subsequently, web presence data can be acquired and employed as a basis to determine the risk posed by a merchant and accordingly whether the merchant is legitimate or illegitimate. In one instance, a secure socket layer (SSL) certificate associated with the web page can be acquired and analyzed. The number of subject alternate names, the similarity of the subject alternate names, or both specified in the certificate can be used to compute a risk score. Additional factors affecting the risk score can include web page code and content (e.g., text, graphics, images . . . ). The risk score can be compared with a threshold, and if the threshold is satisfied, an action can be taken in response. For example, a user alert can be provided to notify a customer of the risk associated with a merchant. Additionally, or alternatively, information about merchant risk or legitimacy can be provided to a transaction processing system to inform decisions regarding approving or denying a transaction or flagging a transaction for further scrutiny.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
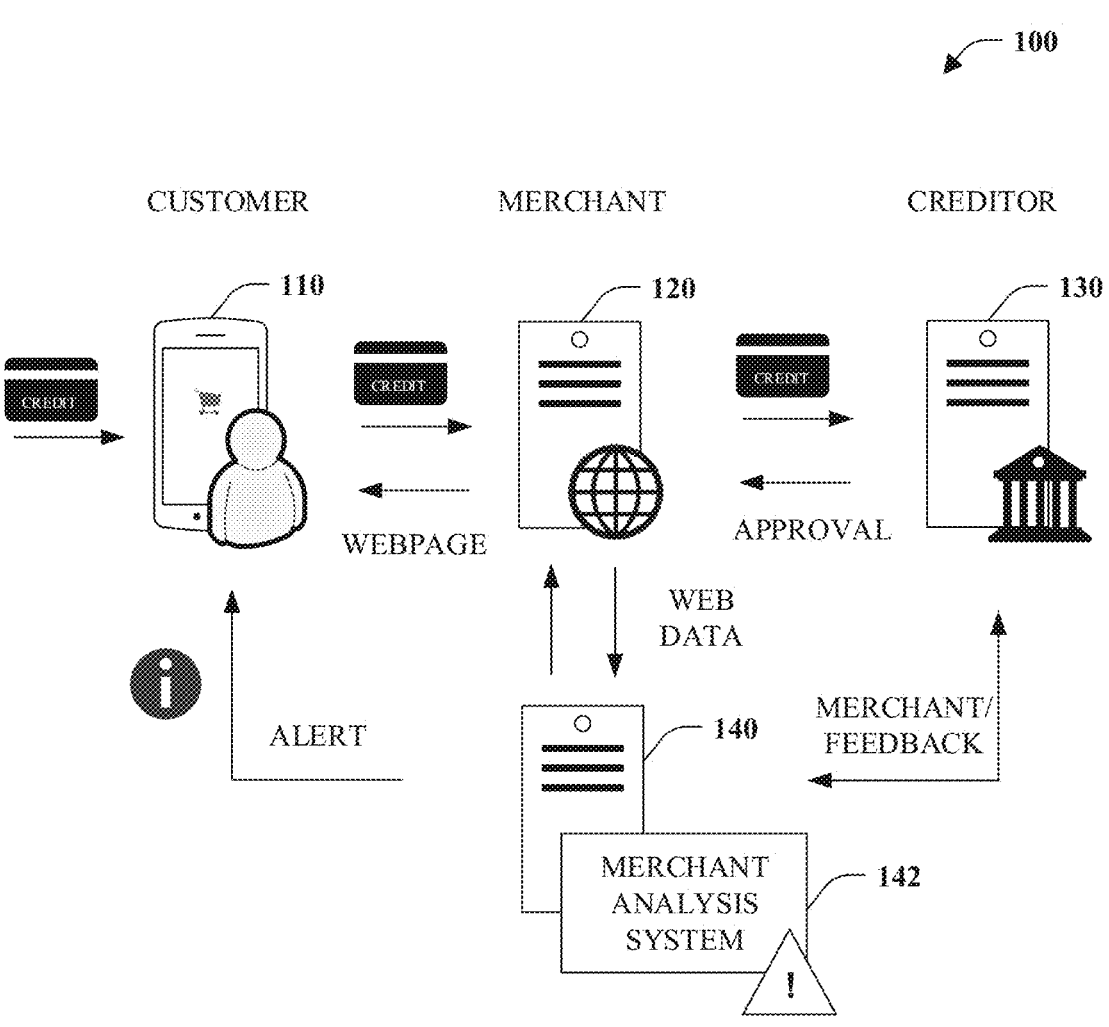
FIG. 1 illustrates an overview of an example implementation.

Referring initially to FIG. 1, a high-level overview of an example implementation 100 is depicted. As shown, the implementation 100 includes a user computing device 110, a web server 120, a transaction server 130, and data analysis server 140 that executes a merchant analysis system 142.

The user computing device 110 displays a web page of a merchant provided by the web server 120. The web page includes products or services offered for sale by the merchant and includes functionality to support electronic purchases of the products or services. For example, a customer can interact with the web page to add items to an electronic shopping cart. To complete the purchase, the customer enters credit card information that is sent back to web server 120 for further processing.

The web server 120 serves a web page or collections of web pages forming a merchant's website to the user device over a network such as the Internet. The web server 120 can be an on-premises server of the merchant, off-premises server provided as a service, or hybrid model. The web page or website can support electronic shopping utilizing an electronic shopping cart, for example. The web server can acquire payment in the form of credit card information from a user and associated user computing device 110. In response, the web server 120 can connect with the transaction server 130 for approval and further payment processing to debit the customer's account and credit the merchant's account.

The transaction server 130 is configured to process payments. The transaction server 130 can be an on-premises, off-premises, or hybrid server of a financial institution such as a bank. Further, it should be appreciated that an intermediary payment processing system can reside between the web server 120 and the transaction server 130, such as Visa® or MasterCard®, which is not illustrated for clarity and simplicity. The transaction server 130 can receive the request and credit card information and approve or deny the payment based on credit limits or other factors.

The web server 120 can receive a response from the transaction server 130 of a creditor and proceed accordingly. If payment is approved, web server 120 can proceed with completing a checkout process. If payment is denied, the web server 120 can notify the customer of the denial and request alternate payment, for instance.

The data analysis server 140 executes a merchant analysis system 142 to identify legitimate and potentially fraudulent merchants. To facilitate processing, the merchant analysis system 142 receives, retrieves, or otherwise obtains or acquires a merchant name or identifier from the transaction server 130 or a database associated therewith. A creditor will document and process a transaction between a merchant and a customer. The merchant name and optionally other additional information (e.g., location, phone number, other contact information) can be determined from such a record.

A web page address or uniform resource locator can be determined based on the merchant name and other information. In one instance, the address can be provided with the merchant name. Alternatively, the merchant name and other information can be utilized as search terms to query one or more databases for the address. Web data or information can be acquired once the web address or uniform resource locator (URL) is identified.

Financial transactions associated with shopping using a credit card typically require a secure connection. Secure socket layer (SSL) communication protocol is the technology utilized to secure and encrypt sensitive information such as credit cards and other private data sent over the Internet. SSL employs an SSL certificate for security and identification. The SSL certificate includes a variety of information, including the issuer of the certificate (e.g., trusted or untrusted), key issuer, valid dates (e.g., issue date, expiration date), subject (e.g., whom the certificate was issued to, what the certificate is used for and where), public key, and a signature of the issuer. Furthermore, the certificates can be subject alternative name (SAN) certificates or multi-domain certificates. In this case, users can specify, and the certificate can identify, more than one host name for a single SSL certificate. Consequently, a user can secure multiple domains with a single SSL certificate. For example, an SSL certificate can be associated with "shop.domain.com" as well as "mail.domain.com," among others.

The merchant analysis system 142 can acquire the SSL certificate by initiating a communication with the web server 120. An SSL handshake process can be performed in which the web server 120 sends the SSL certificate to the analysis server 140, which the merchant analysis system 142 can acquire. The merchant analysis system 142 can then extract information from the SSL certificate that can be utilized as a feature or factor in determining the potential legitimacy or risk of fraud associated with a merchant.

In one instance, the number of subject alternative names (SANs) can be utilized as a basis for computing a risk score associated with a merchant. Merchants that defraud or deceive customers can operate multiple domains. Further, one domain can be shut down, and another domain can be opened once customers become aware of fraudulent or deceitful actions of a merchant. A threshold number of SANs can be determined based on analysis of data of known fraudulent merchants. The merchant analysis system 142 can then compare the number of SANs to the threshold. If the threshold is satisfied, such as when the number of SANs exceeds the threshold, the merchant analysis system 142 can trigger further action. For example, an alert can be generated and sent to a user to inform the user of a potentially illegitimate merchant. Alternatively, the merchant analysis system 142 can contact the transaction server 130 and affect the approval decision or other actions. For example, a transaction might not be approved or otherwise flagged for further investigation.

Other factors can also be considered in determining risk, including similarity of subject alternate names as well as issue and expiration dates. Further yet, the merchant analysis system 142 can receive web page code and content and utilize such information to identify a merchant as legitimate or illegitimate. For example, the web page can include words, phrases, or classes that indicate a potentially fraudulent business operation, such as nutrition (e.g., lose weight fast) and cosmetics (e.g., wrinkle reduction). In addition, stock images (e.g., operator with a headset) known or likely to be associated with a fraudulent business can be identified and utilized to assess risk. Further, fine print details can be analyzed to aid in determining legitimacy. For instance, the fine print might note that purchasing a product also signs a customer up for a monthly subscription service.

In accordance with one embodiment, the merchant analysis system 142 can correspond to a trained machine learning model. For example, a merchant assessment model based on transaction history can be updated to include web presence features to aid risk assessment absent sufficient transaction history. Of course, the merchant analysis system could also be a separate machine learning model trained on web presence features and invoked to determine a risk score associated with a merchant independent of transaction history.

Figure 2:
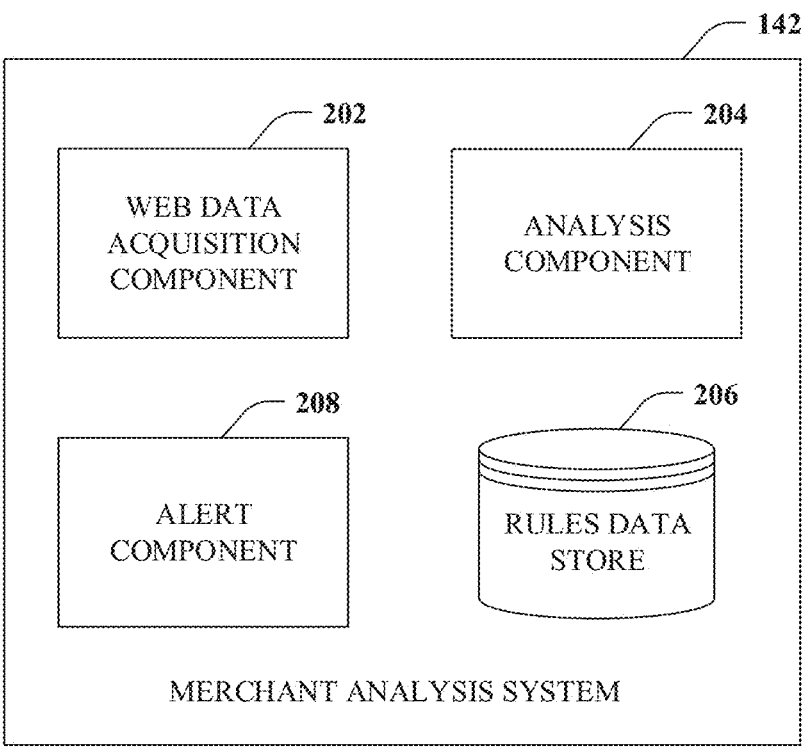
FIG. 2 is a block diagram of an example merchant analysis system.

Turning attention to FIG. 2, an example merchant analysis system 142 is illustrated in further detail. The merchant analysis system 142 includes web data acquisition component 202, analysis component 204, rules data store 206, and alert component 208. The web data acquisition component 202, analysis component 204, and alert component 208 can be implemented by a processor coupled to a memory that stores instructions that, when executed, cause the processor to perform the functionality of each component. Further, the rules data store can correspond to a persistent data structure (e.g., table) accessible by analysis component 204. As such, a computing device is configured to be a special-purpose device or appliance that implements the functionality of the merchant analysis system 142.

The web data acquisition component 202 is operable to receive, retrieve, or otherwise obtain or acquire data associated with a merchant's web presence. The data can include a digital certificate, code, and content of a merchant's web page or website. The web data acquisition component 202 can receive or retrieve a merchant identifier, such as a merchant name, from a transaction between a customer and a merchant recorded by a creditor. The web data acquisition component 202 can utilize the merchant's name to search a database or the web for a web address or uniform resource locator (URL) of the merchant. Any additional available information associated with a transaction, such as an address, email, or phone number, can be utilized to further aid identification of the web address or verify an identified address. Once the web address or URL is determined, the web data acquisition component can initiate contact with a web page or site and acquire web presence data such as an SSL certificate, web page code, and content (e.g., displayed text, images, graphics . . . ).

The analysis component 204 is operable to analyze web presence data and compute a risk score. The risk score is a value that indicates the likelihood that a merchant is legitimate versus illegitimate. In other words, the risk score is a value that captures the probability that the merchant engages in fraudulent, deceitful, or otherwise unscrupulous practices. For example, a merchant could offer a free or substantially discounted product, which unbeknownst to customers, locks them into a costly monthly subscription service. One or more pieces of web presence data can be employed to shed light on the nature of a business by way of the risk score. The analysis component 204 can employ one or more rules to compute the risk score.

The rules data store 206 is a persistent data structure (e.g., database, table . . . ) that saves rules, or the like, regarding how various web presence data affects the risk score. These rules can be manually specified, automatically learned based on supervised or unsupervised machine learning, or both manually specified and automatically learned. In one instance, the risk score can be determined based on the number of subject alternative names associated with a single SSL certificate. It can be determined that below a threshold number is normal and of no impact. However, once the number reaches the threshold, there can be a negative effect on the risk score. Further, the effect can be proportionate to the distance from the threshold number such that one more than the threshold impacts the score less than five more than the threshold. Of course, there can be a spot between values indicative of legitimacy or illegitimacy.

The alert component 208 is operable to generate an alert or perform another action based on the risk score produced by the analysis component 204. A threshold or the like can be specified for action or inaction. For an action threshold, an action can be triggered when the risk score satisfies the threshold. For an inaction threshold, an action is not triggered when the risk score satisfies the threshold. According to one embodiment, an alert can be generated and sent to a customer when the risk score satisfies a threshold. The alert can notify a customer of a potentially troublesome merchant with whom the customer has made a purchase. The alert can further include information regarding a specific factor or set of factors associated with the merchant that triggered the alert (e.g., deceitful fine print, content/behavior similar to known illegitimate merchant, . . . ). For example, the factor that increased the risk the most can be noted. Alternatively, the action can correspond to feedback to a transaction approval system to allow the system to consider the risk score in approving or denying a transaction or activate further scrutiny of merchant transactions.

Figure 3:
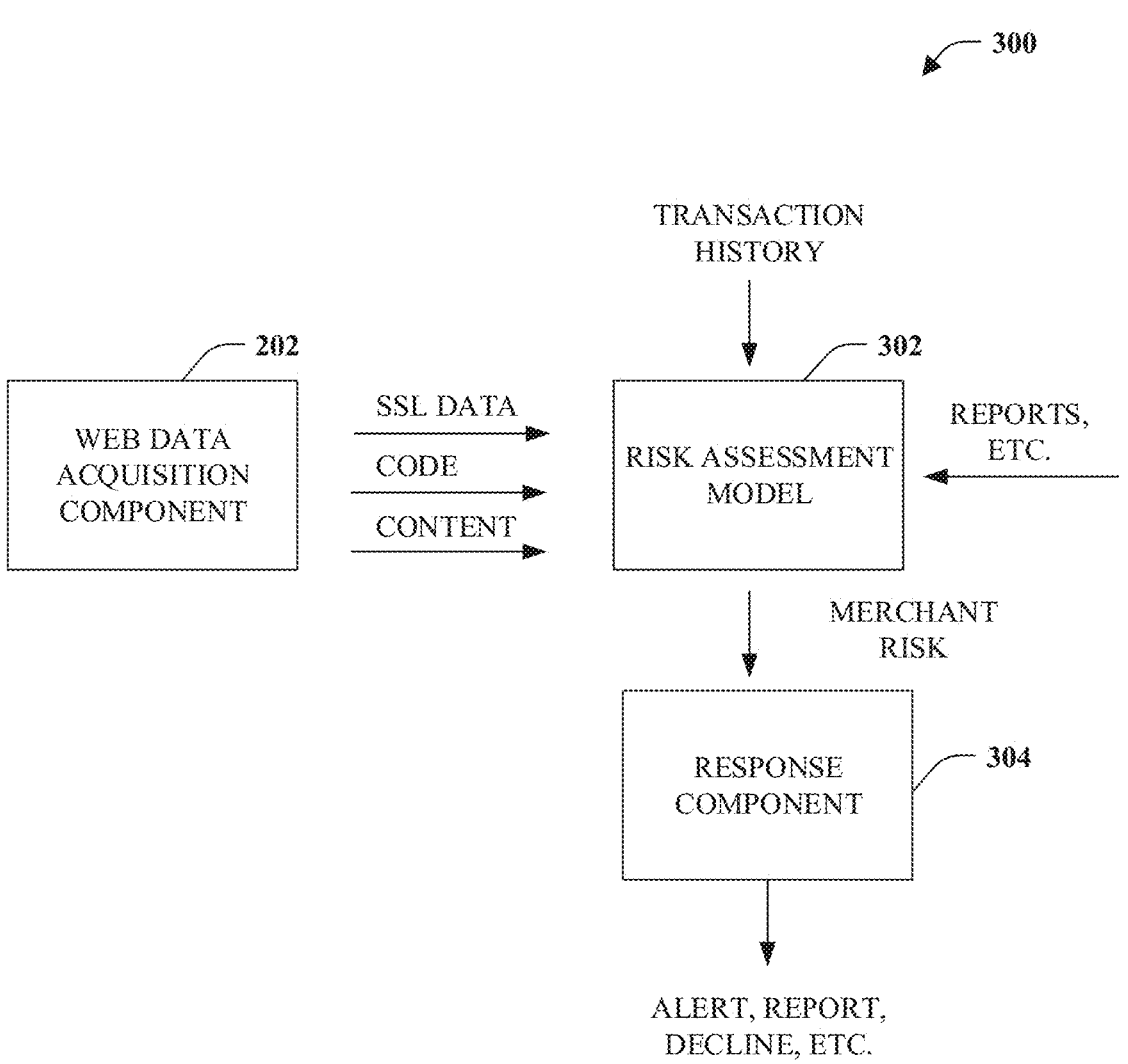
FIG. 3 is a block diagram of another example merchant analysis system.

FIG. 3 depicts another example merchant analysis system 142 in accordance with one particular embodiment. The system 142 comprises the web data acquisition component 202, a risk assessment model 302, and a response component 304.

The web data acquisition component 202 is operable to receive, retrieve or otherwise obtain or acquire web presence data associated with a merchant. The web data acquisition component 202 can receive or retrieve a merchant name or identifier recorded for a transaction between the merchant and a customer. The merchant name can be utilized to determine a web address or uniform resource locator associated with the merchant, for example, from a database or web query. Utilizing the web address, a secure socket layer (SSL) certificate can be acquired as well as website code and content (e.g., text, images, graphics . . . ). Data can further be extracted from web presence data. For example, the number of subject alternate names and the similarity of subject alternate names can be determined from the SSL certificate. Image recognition technology can also be employed to recognize images and elements of images for further consideration.

The risk assessment model 302 is a machine learning model trained to assess risk associated with merchants. According to one embodiment, the risk assessment model 302 can be trained from transaction history and reports of merchant issues such as allegations of fraud. However, such training can limit usefulness for merchants with little or no transaction history. The web presence data provided by the web data acquisition component 202 can be used as additional model data to address this issue. Features can be extracted from this data that improve the prediction power of the risk assessment model 302 over a transaction-history-based model for new merchants with inadequate transaction history.

In accordance with one embodiment, the risk assessment model 302 can be a classification model. A classification model predicts a class label for given input data. For example, the risk assessment model 302 can utilize binary classification to identify a merchant as legitimate or illegitimate or multi-class classification to label a merchant as high, medium, or low risk. Data utilized to train a classification model can comprise web presence data and specific labels associated with a merchant with such web presence data. A classification model can employ various algorithms or techniques, including logistic regression, k-nearest neighbors, decision trees, and support vector machines, among others.

Rather than simply predicting a specific class label, a probability of class membership can be returned. The probability captures the likelihood or uncertainty of an example belonging to a class (e.g., legitimate, illegitimate, high risk, average risk, low risk, . . . ). Instead of identifying a merchant as legitimate or not, the model can return a probability that the merchant is legitimate or illegitimate. For example, there is a ninety percent chance that the merchant is legitimate or a ten percent chance that the merchant is illegitimate. The likelihoods can be computed for different features and combined with weights to produce a final probability. For instance, a risk score based on little, or no, transaction history can be combined with a score associated with web presence data. Here, the risk score can correspond to a probability that a merchant is of high risk. Of course, a threshold probability can be utilized to convert the probability or score to a particular class designation later in the process, if desired.

The response component 304 is configured to trigger a response to the output of the risk assessment model. The response component 304 can receive, retrieve, or otherwise obtain or acquire merchant risk in the form of a classification or probability from the risk assessment model 302 or associated data store. The merchant risk can be evaluated, in one instance, by comparing the risk to a threshold. If the threshold is satisfied, one or more actions can be triggered in response. In one instance, the response component 304 can trigger an alert or other notification to be sent to a customer. For instance, a customer who purchased a product or service from a merchant can be notified that the merchant is legitimate or illegitimate. Notification that the merchant is legitimate or of low fraud risk can reduce potentially mistaken reports of fraud. Notification that the merchant is illegitimate or high fraud risk may result in a customer scrutinizing a transaction thoroughly to avoid being defrauded and promptly reporting any instances of fraud. In another instance, the response component 304 can notify or otherwise provide input to a transaction system to provide another piece of information to consider concerning approving or denying transactions. In this scenario, the transaction system can also flag a transaction associated with a high-risk merchant for further analysis. For example, the transaction system can provisionally approve a transaction with a merchant. Final approval can then be subject to confirmation by the customer or member of a loss prevention team.

The aforementioned systems, architectures, platforms, environments, or the like have been described with respect to interaction between several components. It should be appreciated that such systems and components can include those components or sub-components specified therein, some of the specified components or sub-components, and/ or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished following either a push and/or pull control model. The components may also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers, . . . ). Such components, among others, can automate certain mechanisms or processes performed thereby, making portions of the systems and methods more adaptive as well as efficient and intelligent. By way of example, and not limitation, the merchant analysis system 142 can employ such mechanisms to automatically determine a risk score, classify merchants, or determine the likelihood or probability that a merchant is legitimate or illegitimate based on web presence data.

In view of the example systems described above, methods that may be implemented in accordance with the disclosed subject matter will be better appreciated with reference to flow chart diagrams of FIGS. 4-7. While for purposes of simplicity of explanation, the methods are shown and described as a series of blocks, it is to be understood and appreciated that the disclosed subject matter is not limited by order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 4:
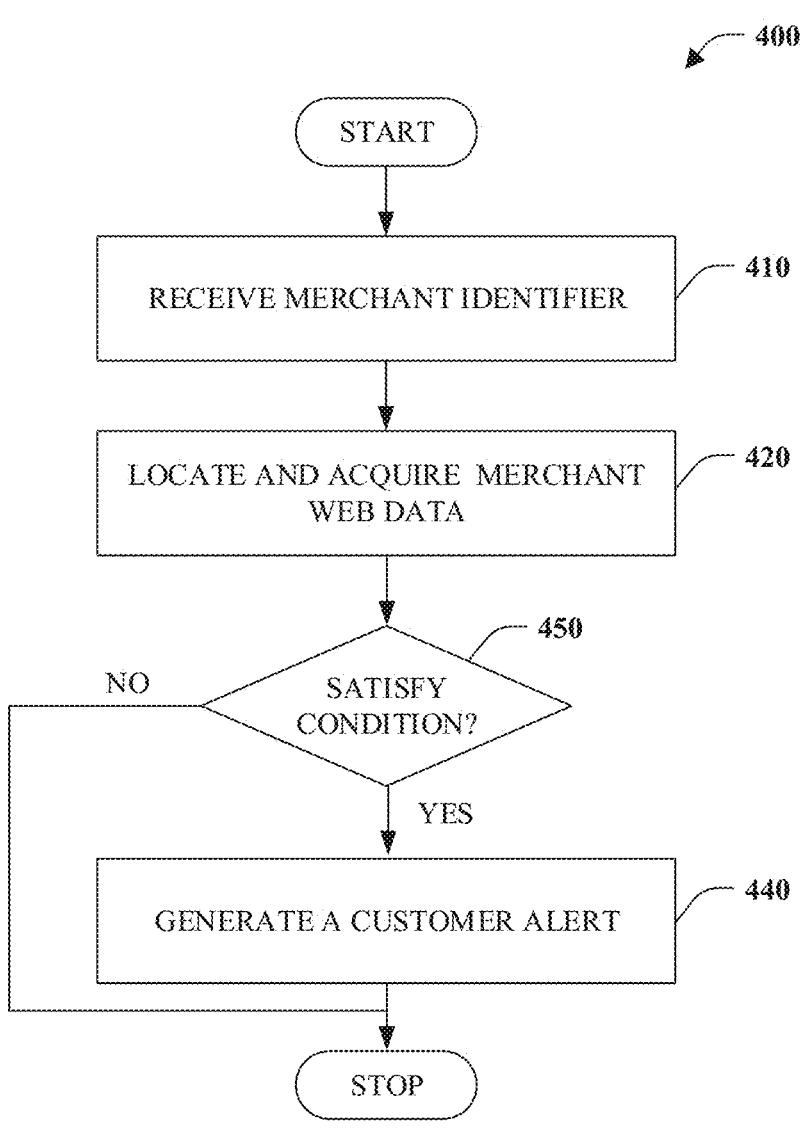
FIG. 4 is a flow chart diagram of a merchant analysis method.

Turning attention to FIG. 4, a merchant analysis method 400 is depicted. The merchant analysis method 400 can be performed by the merchant analysis system 142.

At reference numeral 410, a merchant identifier is received, retrieved, or otherwise obtained or acquired. The merchant identifier can correspond to a merchant name or other data that distinguishes the merchant from other merchants (e.g., trade name, corporate name, tax identifier . . . ). In accordance with one aspect, the merchant identifier can be acquired from a recorded transaction with a customer. The merchant's name and other information can be provided as part of transaction data associated with use of a credit card by a customer to pay for a product or service. Other information included with a transaction can include at least a business address, phone number, and account number.

At numeral 420, merchant web data is located and acquired. The merchant identifier can be utilized to query a database to determine a merchant's web address or uniform resource locator (URL). In a situation in which the merchant's web address is provided as part of the transaction data, this step can be skipped. Once the merchant's web address is acquired, communication can be established with the web address. More specifically, the internet protocol (IP) address of the web address is located, and a web server is contacted at the IP address utilizing hypertext transfer protocol. A request is sent as part of the initial contact for a web page hosted by the web server. Further, a secure socket layer (SSL) handshake or the like can be performed that includes receiving an SSL certificate from the web server to enable secure communication. After secure communication is established, web page code can be provided. The web page code can also include calls to acquire images and graphics from the web server, among other web content. The SSL certificate and web page code and content comprise web presence data, forming the basis for assessing the risk associated with a merchant.

At reference 450, a determination is made as to whether a condition is satisfied. One or more conditions can be specified for web presence data that trigger an action. The web presence data can be analyzed for the presence of a condition. For example, the content of the SSL certificate can be analyzed to determine the number of subject alternative names and similarity of names. Further, the web content can be analyzed for particular words and stock images and graphics. If web presence data does not satisfy a condition ("NO"), the method can terminate. If web presence data does satisfy a condition ("YES"), the method continues at 440.

At reference numeral 440, a customer alert is generated. The customer alert can seek to inform a customer of a particular condition related to a merchant. For example, the alert can note that the merchant is classified as legitimate (e.g., low-risk for fraud) or illegitimate (e.g., high-risk for fraud). In this manner, customers can be better informed, reducing the number of false fraud complaints and increasing vigilance concerning suspect merchants. Further, this information is obtained without relying on a history of transactions and fraud reports. However, this information can be complementary to a risk score computed based on a history of transactions and fraud reports if the history and reports exist.

Figure 5:
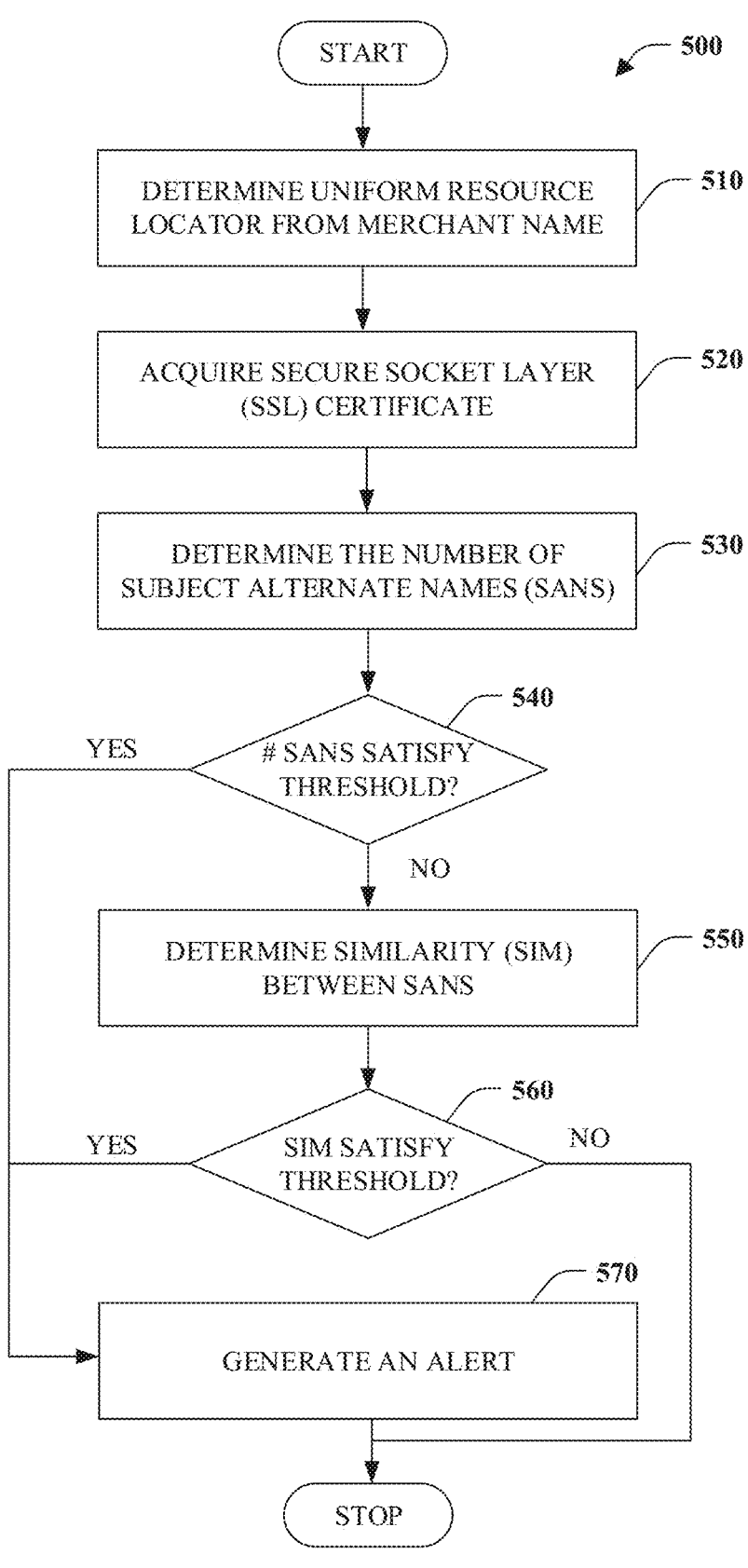
FIG. 5 is a flow chart diagram of a method of merchant analysis based on a secure socket layer (SSL) certificate.

FIG. 5 illustrates a method 500 of merchant analysis utilizing a secure socket layer (SSL) certificate. The method can be performed by the merchant analysis system 142.

At reference numeral 510, a uniform resource locator (URL) or web address is determined from a merchant's name. A database can be created that stores the names of merchants and their corresponding web addresses. This database can be queried to determine the URL associated with a merchant. Alternatively, a web search application can be used to identify the URL for the merchant's name and any other information regarding the merchant (e.g., address, phone number, type of merchant, goods for sale . . . ).

At numeral 520, the secure socket layer (SSL) certificate is acquired. A request can be made for a web page associated with the determined URL over hypertext transfer protocol or the like. As part of the negotiation to establish communication with a web server, the SSL certificate can be provided to enable secure communication, for example, by way of an encryption key specified in the SSL certificate. Not all web pages or websites use secured communication. However, it is prevalent for web pages that support financial transactions.

At reference numeral 530, the number of subject alternate names (SANS) is determined. Subject alternate names are additional host names for a single SSL certificate. Stated differently, multiple domain names can be secured with one SSL certificate. The SSL certificate can be accessed, and the number of subject alternate names counted.

At reference numeral 540, a determination is made as to whether the number of subject alternate names satisfies a threshold, which can be a risk factor. The threshold can correspond to a range of numbers indicative of potential fraud based on historical comparison of fraudulent merchants and a number of subject alternate names. If the threshold is satisfied ("YES"), the method proceeds to numeral 570. If the threshold is not satisfied ("NO"), the method continues at reference numeral 550.

At reference numeral 550, the similarity is determined between a number of subject alternate names. One or more known or novel similarity measures (e.g., approximate string matching) can be utilized to determine the similarity or dissimilarity for each pair of names and a set of subject alternate names.

At reference 560, a determination is made as to whether or not the similarity between subject alternative names satisfies a threshold, which can also be a risk factor. The threshold can be set based on known illegitimate or fraudulent merchants and the similarity of their subject alternate names. It can be the case in which an illegitimate merchant seeks to utilize very similar names. If the similarity does not satisfy the threshold for further action ("NO"), the method can terminate. Alternatively, if the similarity does satisfy the threshold ("YES"), the method can continue at numeral 570.

At reference numeral 570, an alert can be generated. The alert is triggered in response to a number of subject alternate names satisfying a first threshold or a similarity between subject alternate names satisfying a second threshold. Both cases are associated with a potentially fraudulent or illegitimate merchant. In one instance, a customer can be alerted to such a merchant to increase vigilance when transacting with the merchant. Additionally, or alternatively, the alert can be generated for a transaction approval system to aid in determining whether to approve or deny a transaction and when to flag a transaction for further processing or consideration.

Figure 6:
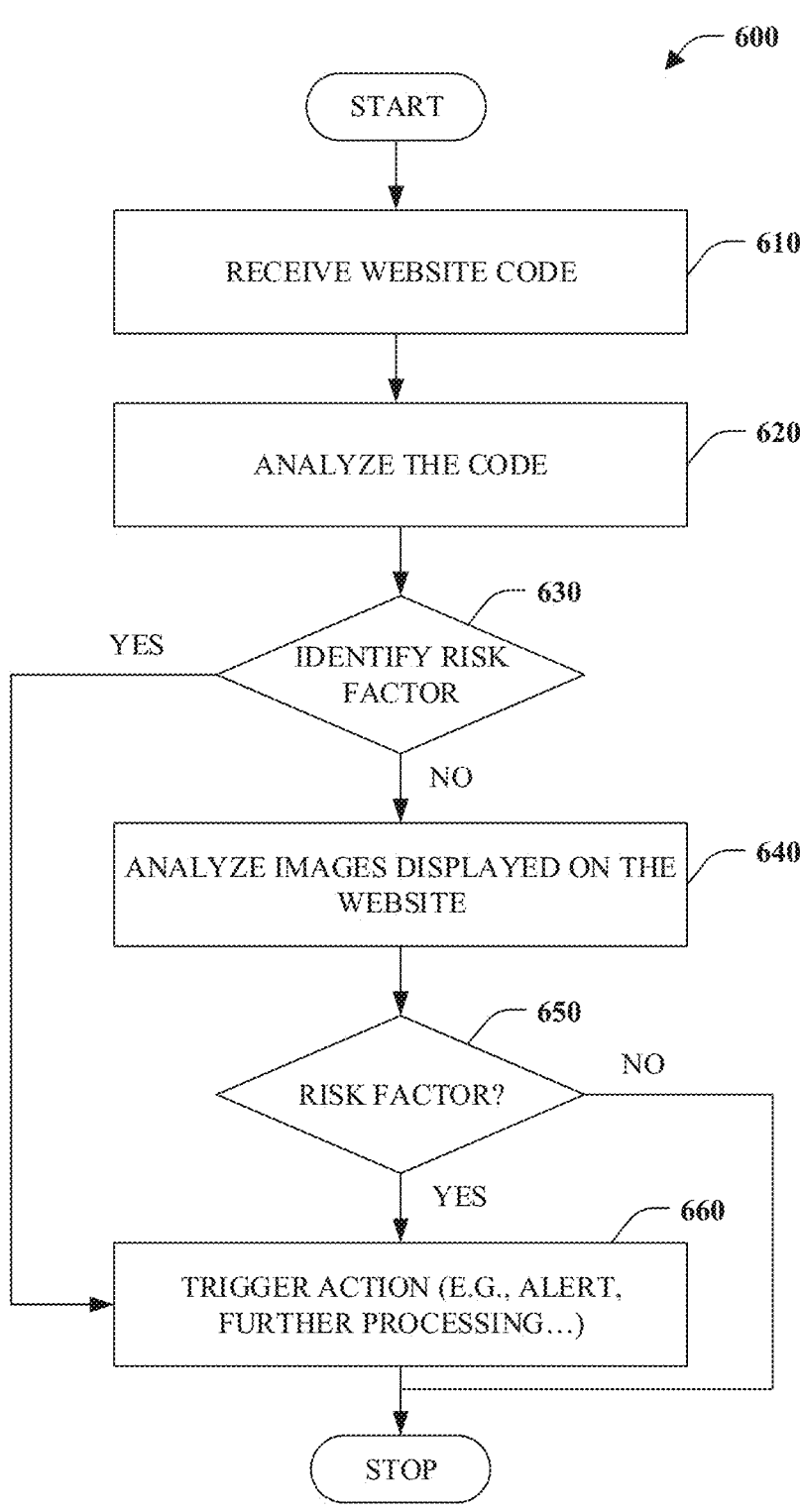
FIG. 6 is a flow chart diagram of a merchant analysis method based on web page code and content.

FIG. 6 illustrates a method 600 of merchant analysis in accordance with an aspect of this disclosure. The method 600 can be implemented and performed by the merchant analysis system 142.

At reference numeral 610, web page or website code is received, retrieved, or otherwise obtained or acquired. The web page can be that of a merchant subject to analysis. The merchant name can be acquired from a credit card transaction record and utilized to determine the merchant's web address. The web address can then be employed to acquire the internet protocol (IP) address of the web server hosting the web page or site. Subsequently, the code can be acquired in response to a request.

At reference 620, the web page or website code can be analyzed. For example, syntactic analysis can be performed by a parser to capture component parts of the code. Subsequently, semantic analysis can be performed to understand the meaning of the code and portions thereof. Moreover, the analysis can seek to identify risk factors in the code. For example, pattern matching technology such as regular expressions can be employed to identify known risk factors.

At reference numeral 630, a determination is made as to whether or not a risk factor was identified in the code. If a risk factor was identified ("YES"), the method continues at numeral 660, triggering an action. Alternatively, if a risk factor was not identified ("NO"), the method proceeds to numeral 640.

At numeral 640, images or other graphics specified by the web page code can be analyzed. For example, images can be compared to known stock images. Further, image analysis can be employed to extract features of an image for comparison against features typical of suspect merchants. It has been observed that illegitimate merchant websites typically utilize a person with a headset that is standing by to take a call. Accordingly, the analysis can seek to identify such images.

At reference numeral 650, a determination is made as to whether or not the image analysis identified a risk factor, such as an image of an operator with a headset. If no risk factor was detected ("NO"), the method can terminate. However, if a risk factor was detected ("YES"), the method can continue at 660.

At reference numeral 660, an action is triggered in response to identification of a risk factor. In one instance, a user can be notified of the risk associated with a merchant through a user alert. Additionally, or alternatively, the action can correspond to initiating further processing of transactions including the merchant. For example, in the future, a user may need to employ a second level of authorization for the transaction, such as from a user device, similar to two-factor authentication.

Figure 7:
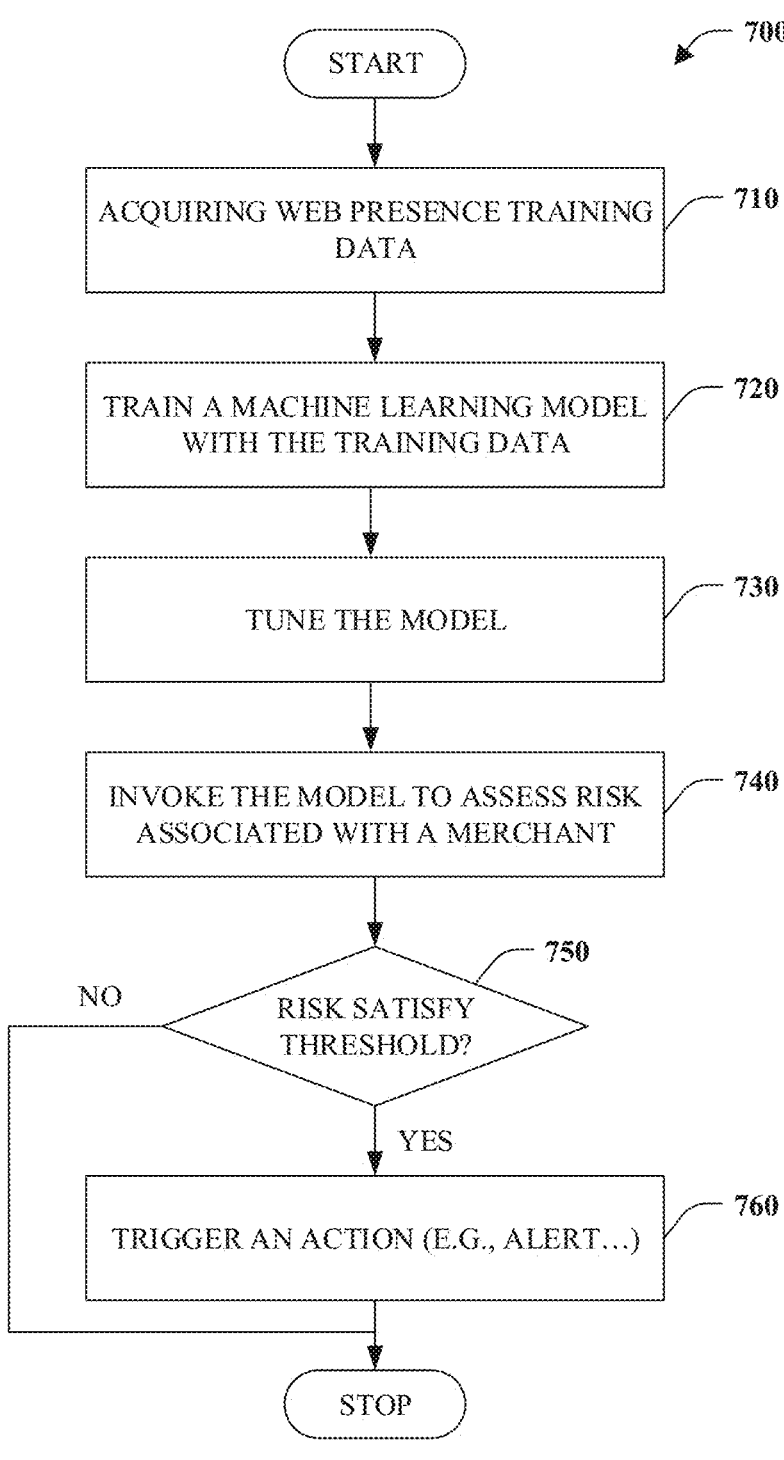
FIG. 7 is a flow chart diagram of a method of merchant risk assessment.

FIG. 7 is a flow chart diagram of a method 700 of merchant risk assessment. The method can be implemented and executed by the merchant analysis system 142.

At reference numeral 710, the web presence training data is received, retrieved, or otherwise obtained or acquired. Web presence data includes data associated with a web page or website, including SSL certificate, code, and content. Training data can comprise labeled web presence data, wherein the label identifies an associated merchant as legitimate or illegitimate, risky or not risky, or the like. For example, the number of subject alternative names can be determined for merchants known to be legitimate or illegitimate.

At numeral 720, a machine learning model is trained with acquired training data. The training data provides the model with experiential data from which the model can learn. In accordance with one embodiment, the machine learning model can be a classification model that seeks to classify a merchant as legitimate or illegitimate or high, average, or low risk based on the training data. In one instance, the classification model can provide the probability or likelihood that a merchant belongs to a particular class alone or in combination with a determined class. In accordance with another embodiment, a numerical risk score can be computed that may, but need not, correspond to the probability that a merchant is risky or safe. Various machine learning algorithms or techniques can be employed to determine a class or risk score, including regression, decision trees, k-nearest neighbor, naïve Bayes, and support vector machines, among others. Further, the machine learning model can implement deep learning by way of an artificial neural network. The machine learning model can utilize web presence data to identify features and significance to a merchant legitimacy or risk assessment goal.

At reference numeral 730, the machine learning model can be tuned. Training data can be bifurcated such that a portion is used for training and another portion is designated for testing. Accordingly, the machine learning model can be provided with training data designated for testing as input, and the output of the machine learning model can be evaluated for accuracy. Hyperparameters can be changed, and the model retrained until the model's optimal or most accurate version is created. In other words, a loss function is minimized over independent data. The hyperparameters are parameters that control the learning process as opposed to values of model parameters that are learned automatically. For example, the rate of learning can be adjusted to tune the model.

At reference numeral 740, the machine learning model is invoked in a production environment on a particular merchant or merchant identifier. The received response can correspond to a classification, probability, or risk score associated with the input merchant.

At numeral 750, a determination is made regarding whether or not the received risk score satisfies a predetermined threshold for further action. If the risk score does not satisfy the threshold ("NO"), the method can terminate. If the risk score does satisfy the threshold ("YES"), the method can continue at 760.

At reference numeral 760, an action is triggered in response to the risk satisfying a threshold. The action can be an alert to a customer advising the user of the potential risk associated with transacting with the merchant. Alternatively, the action can be a notification provided to a transaction processing system for use in approving or denying transactions or subjecting transactions to further scrutiny before approving.

The subject disclosure pertains to the technical problem of online merchants, and more particularly, identifying illegitimate online merchants absent the presence of substantial transaction history. The technical solution includes identifying a web page or site of a merchant and acquiring web presence data associated therewith, such secure socket layer data including the number of subject alternate names and their similarity as well as web page code and content. A model can be generated to classify merchants based on these additional features automatically. For example, a machine learning model can be employed to determine a risk associated with a merchant by training the model on such web presence data.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 8:
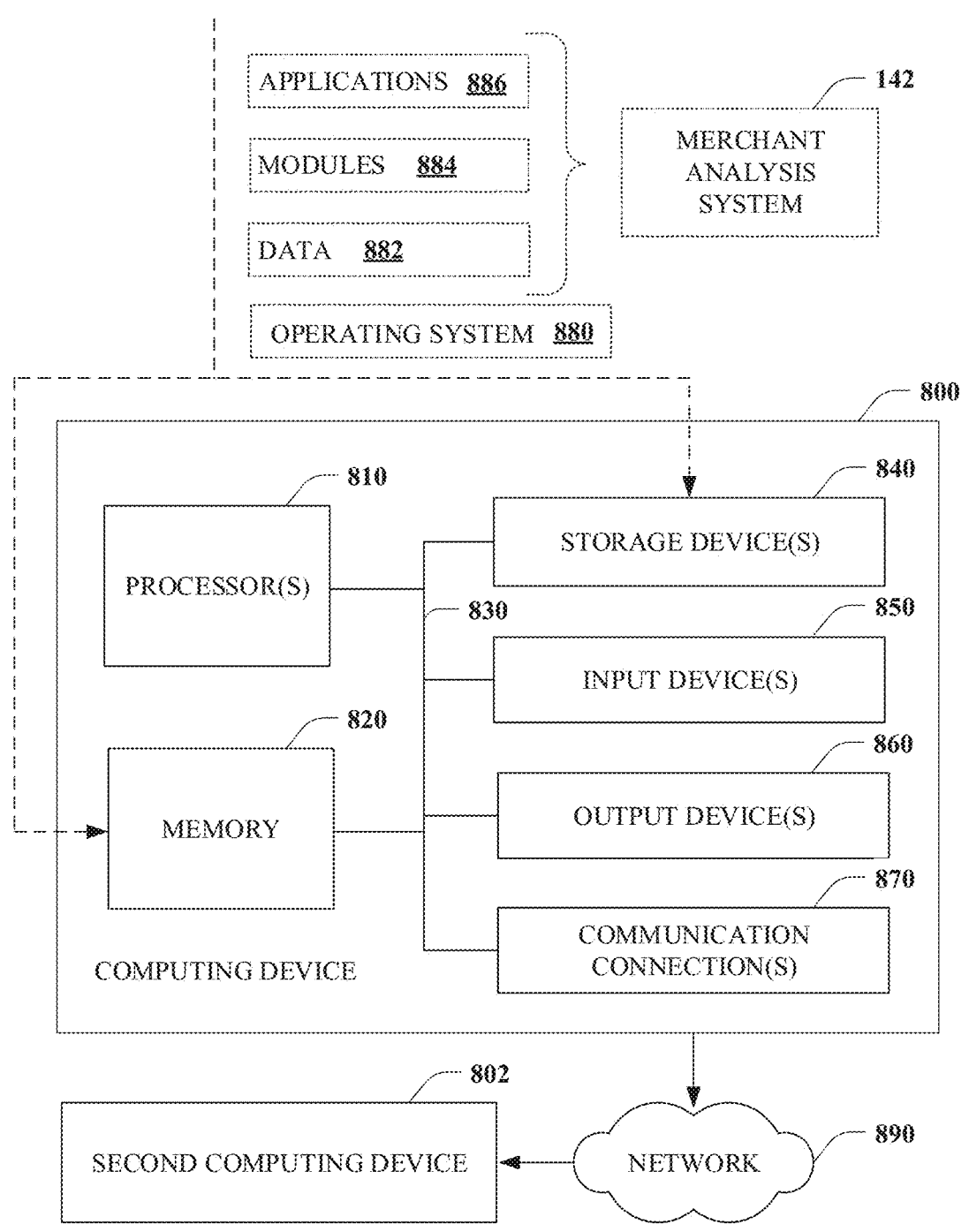
FIG. 8 is a block diagram illustrating a suitable operating environment for aspects of the subject disclosure.

To provide a context for the disclosed subject matter, FIG. 8, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

With reference to FIG. 8, illustrated is an example computing device 800 (e.g., desktop, laptop, tablet, watch, server, hand-held, programmable consumer or industrial electronics, set-top box, game system, compute node, . . . ). The computing device 800 includes one or more processor(s) 810, memory 820, system bus 830, storage device(s) 840, input device(s) 850, output device(s) 860, and communications connection(s) 870. The system bus 830 communicatively couples at least the above system constituents. However, the computing device 800, in its simplest form, can include one or more processors 810 coupled to memory 820, wherein the one or more processors 810 execute various computer-executable actions, instructions, and or components stored in the memory 820.

The processor(s) 810 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 810 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 810 can be a graphics processor unit (GPU) that performs calculations concerning digital image processing and computer graphics.

The computing device 800 can include or otherwise interact with a variety of computer-readable media to facilitate control of the computing device to implement one or more aspects of the disclosed subject matter. The computer-readable media can be any available media accessible to the computing device 800 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 800. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 820 and storage device(s) 840 are examples of computer-readable storage media. Depending on the configuration and type of computing device, the memory 820 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 800, such as during start-up, can be stored in non-volatile memory, while volatile memory can act as external cache memory to facilitate processing by the processor(s) 810, among other things.

The storage device(s) 840 include removable/non-removable, volatile/non-volatile storage media for storage of vast amounts of data relative to the memory 820. For example, storage device(s) 840 include, but are not limited to, one or more devices such as a magnetic or optical disk drive, floppy disk drive, flash memory, solid-state drive, or memory stick.

Memory 820 and storage device(s) 840 can include, or have stored therein, operating system 880, one or more applications 886, one or more program modules 884, and data 882. The operating system 880 acts to control and allocate resources of the computing device 800. Applications 886 include one or both of system and application software and can exploit management of resources by the operating system 880 through program modules 884 and data 882 stored in the memory 820 and/or storage device(s) 840 to perform one or more actions. Accordingly, applications 886 can turn a general-purpose computer 800 into a specialized machine in accordance with the logic provided thereby.

All or portions of the disclosed subject matter can be implemented using standard programming and/or engineering techniques to produce software, firmware, hardware, or any combination thereof to control the computing device 800 to realize the disclosed functionality. By way of example and not limitation, all or portions of the merchant analysis system 142 can be, or form part of, the application 886, and include one or more modules 884 and data 882 stored in memory and/or storage device(s) 840 whose functionality can be realized when executed by one or more processor(s) 810.

In accordance with one particular embodiment, the processor(s) 810 can correspond to a system on a chip (SOC) or like architecture including, or in other words integrating, both hardware and software on a single integrated circuit substrate. Here, the processor(s) 810 can include one or more processors as well as memory at least similar to the processor(s) 810 and memory 820, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the merchant analysis system 142 and/or functionality associated therewith can be embedded within hardware in a SOC architecture.

The input device(s) 850 and output device(s) 860 can be communicatively coupled to the computing device 800. By way of example, the input device(s) 850 can include a pointing device (e.g., mouse, trackball, stylus, pen, touchpad, . . . ), keyboard, joystick, microphone, voice user interface system, camera, motion sensor, and a global positioning satellite (GPS) receiver and transmitter, among other things. The output device(s) 860, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 850 and output device(s) 860 can be connected to the computing device 800 by way of wired connection (e.g., bus), wireless connection (e.g., Wi-Fi, Bluetooth, . . . ), or a combination thereof.

The computing device 800 can also include communication connection(s) 870 to enable communication with at least a second computing device 802 utilizing a network 890. The communication connection(s) 870 can include wired or wireless communication mechanisms to support network communication. The network 890 can correspond to a local area network (LAN) or a wide area network (WAN) such as the Internet. The second computing device 802 can be another processor-based device with which the computing device 800 can interact. In one instance, the computing device 800 can execute the merchant analysis system 142. The second computing device 802 can correspond to a user device that receives alerts regarding merchant risk or a transaction processing system that approves or denies transactions with the merchant.

What has been described above includes examples of aspects of the claimed subject matter. It is, of course, not possible to describe every conceivable combination of components or methodologies for purposes of describing the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A server system for facilitating authorization of a transaction initiated with a merchant via a server-side handshake initiation that (i) is with a web server hosting a web page of the merchant and (ii) occurs after the transaction is initiated with the merchant, the server system comprising:
   one or more processors and memory storing instructions that, when executed by the one or more processors, cause operations comprising:

in response to obtaining, from a transaction server, transaction information for the transaction initiated with the merchant, identifying a merchant name of the merchant from the transaction information and querying a database using the merchant name to determine a web page address for the merchant;

after obtaining the transaction information for the transaction from the transaction server, performing, based on the web page address, a secure socket layer (SSL) handshake process with the web server hosting the web page to acquire an SSL certificate that specifies a plurality of subject alternative names; and transmitting, based on the subject alternative names, an indication for denying the transaction to the transaction server, the transaction server denying the transaction based on the transmitted indication from the server system.

2. The server system of claim 1, wherein, after a user device establishes communication with the web page and initiates the transaction via the web page, the server system obtains the transaction information from the transaction server and performs the SSL handshake process with the web server hosting the web page to acquire the SSL certificate.

3. The server system of claim 1, the operations further comprising:

after obtaining the transaction information for the transaction from the transaction server, extracting, based on the web page address, source code of the web page, wherein transmitting the indication to the transaction server comprises transmitting the indication for denying the transaction to the transaction server based on the subject alternative names and the source code.

4. The server system of claim 1, the operations further comprising:

after obtaining the transaction information for the transaction from the transaction server, obtaining, based on the web page address, an image of the web page, the image comprising a portion of the web page, wherein transmitting the indication to the transaction server comprises transmitting the indication for denying the transaction to the transaction server based on the subject alternative names and the image of the web page.

5. The server system of claim 1, the operations further comprising:

generating, via a machine learning model, a risk indication based on the subject alternative names; and generating the indication for denying the transaction based on the risk indication.

6. A method comprising:

obtaining, by a server system comprising one or more processors, from a transaction server, transaction information associated with a transaction initiated with a merchant;

determining, by the server system, a website address for the merchant based on the transaction information;

performing, by the server system, based on the website address, a secure handshake process with a web server hosting a website of the merchant to obtain a secure certificate, the secure certificate comprising subject alternative names; and transmitting, by the server system, based on the subject alternative names, an indication for approving or denying the transaction to the transaction server, the indication causing the transaction server to approve or decline the transaction.

7. The method of claim 6, wherein performing the secure handshake process comprises performing the secure handshake process with the web server hosting the website to acquire the secure certificate after a user device establishes communication with the website and initiates the transaction via the website.

8. The method of claim 6, further comprising:

extracting, by the server system, based on the website address, source code of the website, wherein transmitting the indication to the transaction server comprises transmitting the indication for denying the transaction to the transaction server based on the subject alternative names and the source code.

9. The method of claim 6, further comprising:

obtaining, by the server system, based on the website address, an image of the website, the image comprising a portion of the website, wherein transmitting the indication to the transaction server comprises transmitting the indication for denying the transaction to the transaction server based on the subject alternative names and the image of the website.

10. The method of claim 6, further comprising:

generating, by the server system, via a machine learning model, a risk indication based on the subject alternative names; and generating the indication for denying the transaction based on the risk indication.

11. The method of claim 6, further comprising:

measuring, by the server system, similarity among the subject alternative names;

wherein transmitting the indication for approving or denying the transaction to the transaction server comprises transmitting, by the server system, based on the measured similarity among the subject alternative names, the indication for approving or denying the transaction to the transaction server.

12. The method of claim 6, wherein the indication comprises an approval indication for approving the transaction.

13. The method of claim 6, wherein the indication comprises a denial indication for denying the transaction.

14. One or more non-transitory computer-readable media storing instructions that when, executed by one or more processors of a server system, cause operations comprising:

obtaining transaction information associated with a transaction initiated with a merchant;

determining a website address for the merchant based on the transaction information;

performing, based on the website address, a secure handshake process with a web server hosting a website of the merchant to obtain a secure certificate, the secure certificate comprising subject alternative names; and transmitting, based on the subject alternative names, an indication for approving or denying the transaction to a transaction server.

15. The one or more non-transitory computer-readable media of claim 14, wherein performing the secure handshake process comprises performing the secure handshake process with the web server hosting the website to acquire the secure certificate after a user device establishes communication with the website and initiates the transaction via the website.

16. The one or more non-transitory computer-readable media of claim 14, the operations further comprising:

extracting, based on the website address, source code of the website, wherein transmitting the indication to the transaction server comprises transmitting the indication for denying the transaction to the transaction server based on the subject alternative names and the source code.

17. The one or more non-transitory computer-readable media of claim 14, the operations further comprising:

obtaining, based on the website address, an image of the website, the image comprising a portion of the website, wherein transmitting the indication to the transaction server comprises transmitting the indication for denying the transaction to the transaction server based on the subject alternative names and the image of the website.

18. The one or more non-transitory computer-readable media of claim 14, the operations further comprising:

generating, via a machine learning model, a risk indication based on the subject alternative names; and generating the indication for denying the transaction based on the risk indication.

19. The one or more non-transitory computer-readable media of claim 14, the operations further comprising:

measuring similarity among the subject alternative names;

wherein transmitting the indication for approving or denying the transaction to the transaction server comprises transmitting, based on the measured similarity among the subject alternative names, the indication for approving or denying the transaction to the transaction server.

20. The one or more non-transitory computer-readable media of claim 14, wherein the indication comprises a denial indication for denying the transaction.

* * * * *